US010582126B2

(12) United States Patent
Muenzenmayer et al.

(10) Patent No.: US 10,582,126 B2
(45) Date of Patent: Mar. 3, 2020

(54) METHOD AND DEVICE FOR GENERATING A MICROSCOPY PANORAMIC REPRESENTATION

(71) Applicant: Fraunhofer-Gesellschaft zur Foerderung der angewandten Forschung e.V., Munich (DE)

(72) Inventors: Christian Muenzenmayer, Hagenbuechach (DE); Alexander Gryanik, Erlangen (DE); Tobias Bergen, Erlangen (DE); Thomas Wittenberg, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 15/294,115

(22) Filed: Oct. 14, 2016

(65) Prior Publication Data

US 2017/0111581 A1   Apr. 20, 2017

(30) Foreign Application Priority Data

Oct. 14, 2015  (DE) .................. 10 2015 219 971

(51) Int. Cl.
*H04N 9/47*  (2006.01)
*H04N 5/232* (2006.01)
(Continued)

(52) U.S. Cl.
CPC ....... *H04N 5/23238* (2013.01); *G02B 21/367* (2013.01); *G06K 9/6201* (2013.01);
(Continued)

(58) Field of Classification Search
CPC .......... G02B 21/18; G02B 21/367; H01L 2924/0002; H01L 2924/00; H01L 25/0753;
(Continued)

(56) References Cited

U.S. PATENT DOCUMENTS

2006/0045505 A1    3/2006  Zeineh et al.
2009/0022419 A1*   1/2009  Molnar .................... G06T 3/40
                                                    382/275
(Continued)

FOREIGN PATENT DOCUMENTS

CN    204188877 U  *  3/2015
EP       1394739 A1 *  3/2004  .......... G06T 3/4038
EP       1394739 A1     3/2004

OTHER PUBLICATIONS

Bergen, T. et al., "A graph-based approach for local and global panorama imaging in cystoscopy", Proceedings of SPIE vol. 2073, vol. 8671, 7 pages.
(Continued)

*Primary Examiner* — Masum Billah
(74) *Attorney, Agent, or Firm* — Michael A. Glenn; Perkins Coie LLP (57) ABSTRACT

Embodiments of the present invention relate to a method for generating a microscopy representation of a three-dimensional sample having a lateral extension in the x and y directions. The method has the following steps: a) arranging the flat three-dimensional sample on a positioner; b) recording the sample by means of an imaging device to obtain a first microscopy picture of the sample having a first section; c) altering the perspective onto the two-dimensional sample in the z direction; d) recording the sample by means of the imaging device to obtain a second microscopy picture of the sample having a second section; e) determining change information which allows drawing conclusions as to the
(Continued)

change in perspective in the z direction, using a difference between the first and second microscopy pictures; and f) merging the first and second microscopy pictures while considering the change information to obtain the microscopy panoramic representation.

19 Claims, 9 Drawing Sheets (51) Int. Cl.
*H04N 13/117* (2018.01)
*G06T 7/11* (2017.01)
*G06T 5/50* (2006.01)
*G06T 3/40* (2006.01)
*G02B 21/36* (2006.01)
*G06K 9/62* (2006.01)

(52) U.S. Cl.
CPC .......... *G06T 3/4038* (2013.01); *G06T 3/4053* (2013.01); *G06T 5/50* (2013.01); *G06T 7/11* (2017.01); *H04N 13/117* (2018.05); *G06T 2207/10056* (2013.01); *G06T 2207/20112* (2013.01)

(58) Field of Classification Search
CPC .......... H01L 33/50; G06T 3/4038; G06T 5/20; G06T 11/60; G06T 15/20; G06T 2207/10024; G06T 2207/10056; G06T 2207/10148; G06T 3/40; G06T 5/002; G06T 7/30

USPC ............................................ 382/282; 348/80
See application file for complete search history.

(56) References Cited

U.S. PATENT DOCUMENTS

2009/0034248 A1* 2/2009 Rudolph ................... F21K 9/00
  362/230
2011/0169985 A1 7/2011 Cooper
2014/0270537 A1* 9/2014 Lo ........................... G06T 11/60
  382/195

OTHER PUBLICATIONS

Bergen, T. et al., "Feature-Based Real-Time Endoscopic Mosaicking", Proceedings of the 6th International Symposium on Image and Signal Processing and Analysis (ISPA), 2009, pp. 695-700.
Bergun, T. et al., "Stitching and Surface Reconstruction from Endoscopic Image Sequences: A Review of Applications and Methods", IEEE Journal of Biomedical and Health Informatics, vol. PP., 2014, 20 pages.
Burt, Peter J. et al., "Merging Images Through Pattern Decomposition", Applications of Digital Image Processing VIII, SPIE vol. 575, 1985, pp. 173-181.
Pieper, R. J. et al., "Image processing for extended depth of field", Applied Optics, vol. 22, No. 10, May 15, 1983, pp. 1449-1453.
Williams, B. et al., "A comparison of loop closing techniques in Monocular SLAM", Robotics and Autonomous Systems, vol. 57, No. 12, 2009, 10 pages.

* cited by examiner

| F1 | F2 | F3 |
|----|----|----|
| F4 | F5 |    |

| F1 | F2 | F3 |
|----|----|----|
| F4 | F5 |    |

P2

| F6 |
|----|

| F1 | F2 | F3 |
|----|----|----|
| F4 | F5 |    |

P2

|     | F6  | F7  | F8 |
|-----|-----|-----|----|
| F12 | F11 | F10 | F9 |

METHOD AND DEVICE FOR GENERATING A MICROSCOPY PANORAMIC REPRESENTATION

CROSS-REFERENCE TO RELATED APPLICATION

This application claims priority from German Application No. 10 2015 219 971.1, which was filed on Oct. 14, 2015, which is incorporated herein in its entirety by this reference thereto.

BACKGROUND OF THE INVENTION

Embodiments of the present invention relate to a method for generating a microscopy panoramic representation, and to a corresponding computer program. Further embodiments relate to a device for generating a microscopy panoramic representation, and to a system including the device and a microscope. Generally, the context of the invention is in the field of image analysis and visualization for microscopy.

Microscopy is used in particular in the medical field. In clinical laboratories and pathology departments, tissue, cells and body fluids are examined, that is evaluated visually under a microscope, every day. Depending on the size of the laboratory or department, these may be a few dozen up to several 1000 microscope slides per day.

In the case of a histopathological examination of tissue sections, the results of this examination (findings) are dictated by the pathologist and then transferred to a findings letter. For cytopathology or hematology (for example when generating a differential hemogram or when analyzing bone marrow), different types of cells are, for example, counted and the parameters documented using a keypad.

Irrespective of these contents and textual information, an iconic (graphic) documentation of the examined tissue cells/body fluid by suitable digital images or image sections also increases in relevance and importance.

At present, there are two basic solution approaches for image-based documentation. In accordance with a first solution approach, a so-called digital slide scanner or automated microscope is used (that is in particular with an automated or motor-movable stage for positioning the microscope slides). Microscope slides over large areas may be digitalized and archived in this way. Due to the automatically acquired digitalized images, panoramas may be generated directly, if necessitated, during the scan operation or even afterwards when using global optimization methods (for a higher quality). An example of such a system is the Zeiss AxioScan.Z1 system. However, the costs for such digital slide scanners are relatively high, thereby entailing a still low spreading of these concepts.

When assuming that the plurality of microscopy pictures which, when merged or stitched (i.e. tile to tile), form a microscopy panoramic representation, are present already in a digitalized form, microscopy panoramic representations may be generated from the individual images using stitching software programs already available on the market. An example of such software is Microsoft Image Composite Editor. Using such software which generates microscopy panoramic representations offline, however, a disadvantage is that the panoramas cannot be visualized in real time. The consequence of this is that it is hard for the user to recognize whether he or she is taking a complete panorama or whether "holes" or "white tiles" remain in the image. This is of particular importance for manual microscopes without automated XY stages. In addition, consequently the user cannot perform corrections in case the images taken have not been merged correctly.

A second concept is using a digital camera in combination with a manual microscope. Digital cameras which are connected to a manually operated microscope (without a motor-operated positioning stage (cross stage)) and corresponding imaging software, are known technology and widespread nowadays. Image and data management system for pathology nowadays comprise interfaces in order to combine individual images from digital cameras directly with the findings or the electronic file of a patient.

Depending on their equipment, these "manual" microscopy systems usually comprise white light (backlight) illumination, higher-quality systems also comprise phase contrast and/or fluorescence illumination. However, usually only individual images but not large-area-regions can be acquired and documented at high a resolution. Therefore, there is need for an improved approach.

SUMMARY

According to an embodiment, a method for generating a microscopy panoramic representation of a three-dimensional sample having a lateral extension in the x and y directions may have the steps of: a) arranging the three-dimensional sample on a positioner; b) recording the sample by means of an imaging device in order to obtain a first microscopy picture of the sample having a first section; c) altering the perspective onto the two-dimensional sample in the z direction; d) recording the sample by means of the imaging device in order to obtain a second microscopy picture of the sample having a second section; e) determining change information which allows drawing conclusions as to the change in perspective in the z direction, using a difference between the first and second microscopy pictures; and f) merging the first and second microscopy pictures while considering the change information in order to obtain the microscopy panoramic representation.

Another embodiment may have a computer program having program code for performing a method for generating a microscopy panoramic representation of a three-dimensional sample having a lateral extension in the x and y directions, having the steps of: a) arranging the three-dimensional sample on a positioner; b) recording the sample by means of an imaging device in order to obtain a first microscopy picture of the sample having a first section; c) altering the perspective onto the two-dimensional sample in the z direction; d) recording the sample by means of the imaging device in order to obtain a second microscopy picture of the sample having a second section; e) determining change information which allows drawing conclusions as to the change in perspective in the z direction, using a difference between the first and second microscopy pictures; and f) merging the first and second microscopy pictures while considering the change information in order to obtain the microscopy panoramic representation, when the program runs on a computer.

According to another embodiment, a device for generating a microscopy panoramic representation of a three-dimensional sample having a lateral extension in the x and y directions may have: an interface for receiving a first microscopy picture of the sample having a first section and a second microscopy picture having a second section, wherein the first microscopy picture and the second microscopy picture differ as regards the perspective in the z direction; and a calculating unit configured to determine change information which allows drawing conclusions as to the change in perspective in the z direction, using a difference between the first and second microscopy pictures and merge the first and second microscopy pictures while considering change information in order to obtain a microscopy panoramic representation.

Another embodiment may have a system having a microscope and a device as mentioned above.

According to another embodiment, a method for generating a microscopy panoramic representation of a three-dimensional sample having a lateral extension in the x and y directions may have the steps of: a) arranging the three-dimensional sample on a positioner; b) recording the sample by means of an imaging device in order to obtain a first microscopy picture of the sample having a first section; c) altering the perspective onto the two-dimensional sample in the z direction; d) recording the sample by means of the imaging device in order to obtain a second microscopy picture of the sample having a second section; e) determining change information which allows drawing conclusions as to the change in perspective in the z direction, using a difference between the first and second microscopy pictures; and f) merging the first and second microscopy pictures while considering the change information in order to obtain the microscopy panoramic representation; wherein the change in perspective in the z direction has a change in the depth of focus.

According to still another embodiment, a device for generating a microscopy panoramic representation of a three-dimensional sample having a lateral extension in the x and y directions may have: an interface for receiving a first microscopy picture of the sample having a first section and a second microscopy picture having a second section, wherein the first microscopy picture and the second microscopy picture differ as regards the perspective in the z direction; and a calculating unit configured to determine change information which allows drawing conclusions as to the change in perspective in the z direction, using a difference between the first and second microscopy pictures and merge the first and second microscopy pictures while considering change information in order to obtain a microscopy panoramic representation; wherein the change in perspective in the z direction has a change in the depth of focus.

Embodiments of the present invention provide a method for generating a microscopy panoramic representation of a three-dimensional sample having a lateral or flat extension in the x and y directions. The method comprises the steps of:
arranging the three-dimensional sample on a positioner;
recording the sample by means of an imaging device in order to obtain a first microscopy picture of the sample having a first section;
altering the perspective onto the two-dimensional sample in the z direction;
recording the sample by means of the imaging device in order to obtain a second microscopy picture of the sample having a second section;
generating change information which allows drawing conclusions as to the change in perspective in the z direction, using a difference between the first and the second microscopy picture; and
merging the first and second microscopy pictures while considering the change information in order to obtain the microscopy panoramic representation.

Thus, the present invention is based on the finding that several images recorded by means of a microscope (with/without motor-operated positioners, for example cross stage, linear drive, robot etc.) and using a camera, which are referred to as microscopy pictures, may be merged to one another in order to obtain a microscopy panoramic representation. There may be different sections in the image, but not necessarily. Rather, the plurality of images differs in that a change in the z direction, for example relative to the point of focus or magnification factor, has taken place while recording. Correspondingly, the above method allows combining a microscopy representation and a region thereof, for example at an increased resolution or at an altered setting of depth of focus or different focusing planes into one and the same microscopy panoramic representation, wherein the change information important for registration (that is zoom or altered focus or shifted section) may be gained directly from the stream of images. Thus, this invention also allows an interactive digitalization of large-area regions of a microscopic positioner (or other technical surfaces) without using a microscope provided with a motor or a fully automatic slide scanner. This means that the method may be employed by commercially available microscopes and digital cameras. Compared to the known technology, this variation is considerably cheaper and is also easy to integrate into existing microscope workplaces, which allows an improved digitalization of the specimens and easier documentation of the sample.

In accordance with embodiments, this may be achieved by an interactive image documentation (for example an image documentation having a region which is present in different magnification steps or in different focusing planes).

In accordance with embodiments, two different microscopy pictures of different focusing or different sharpness are merged such that the microscopy picture or a region from a microscopy picture is inserted into or connected to another one in case it comprises, seen from a relative point of view, the greatest measure of sharpness. In accordance with embodiments, the method may thus also comprise the step of determining a global or regional measure of sharpness per microscopy picture or per region of a microscopy picture. Determining the largest relative measure of sharpness takes place by means of a comparison, for example.

In accordance with further embodiments, the first and second microscopy pictures may also differ as regards their magnification factor so that a microscopy picture having a greater magnification factor compared to the other microscopy picture is inserted into the other microscopy picture or connected thereto. In accordance with embodiments, the magnification factor is determined either using the image contents or a change in objective is recognized, for example using a temporarily covered region in the stream of images. Consequently, this means that, by merging two microscopy pictures of different magnification factors, the microscopy panoramic representation comprises an increased resolution in a region. It is to be pointed out here that, in accordance with embodiments, only regions registered to one another (that is better oriented to one another and representing the same object section) may be interchanged. Thus, in accordance with additional embodiments, the above method may comprise a step of registering matching regions in the first and second microscopy pictures when merging. As regards the matching regions, it is to be pointed out that, depending on the movement and image sequence, overlaps of different sizes, such as, for example, 90% overlap or 100% overlap, or even only 5% overlap, would be conceivable.

In the above embodiments, it has been assumed that, in matching regions, a region of the second microscopy representation is inserted into the first microscopy picture for the microscopy panoramic representation. In accordance with further embodiments, these overlap regions may also be fused to one another or also be present in the microscopy panoramic representation in duplicate or several times such that there are several storage planes in some regions, which represent the same section but differ as regards resolution, focus and/or sharpness.

In accordance with embodiments, merging may of course also be performed by shifting the sections to be merged in the x and/or y directions, i.e. lateral shifting. In case there is no overlap region between two microscopy pictures taken, but these two microscopy pictures are only connected to each other by one or several further microscopy pictures taken at a later point in time, the method may perform merging the two microscopy pictures taken first after the step of recording the third microscopy picture(s).

In accordance with further embodiments, in particular when there are a plurality of microscopy pictures, optimizing the position or orientation of the individual microscopy pictures is also possible afterwards or when there are a sufficient number of microscopy pictures, where the error as regards the arrangement of the microscopy pictures among one another is minimized.

In accordance with further embodiments, it is also conceivable that the steps discussed above (may be except for the step of shifting in the z direction) are repeated for different recording modes. Modes may, for example, differ as regards white light compensation or as regards the modality of obtaining an image (for example white light wide field, phase contrast, fluorescence, dark field/bright field and others).

In accordance with further embodiments, the method may also be executed or supported by a computer program.

Further embodiments provide a device for generating a microscopy panoramic representation, a three-dimensional sample having a lateral extension in the x and y directions. The device includes an interface and a calculating unit. The interface is configured to receive a first microscopy picture of the sample having a first section and a second microscopy picture having a second section, the microscopy pictures differing as regards the perspective in the z direction. The calculating unit is configured to acquire change information which allows drawing conclusions as to the change in perspective in the z direction, using the difference between the two microscopy pictures, and to merge the two microscopy pictures while considering the change information such that the result is a microscopy panoramic representation.

In accordance with further embodiments, a system which comprises the device discussed above in combination with a microscope is provided as well.

BRIEF DESCRIPTION OF THE DRAWINGS

Embodiments of the present invention will be discussed referring to the appended drawings, in which:

FIG. 1b is a schematic illustration of a microscopy panoramic representation which comprises a region of local magnification (change in the z direction), for illustrating the method of FIG. 1a;

FIG. 1c is a schematic illustration of a microscopy panoramic representation which, in an overlapping region, comprises image information of altered focusing (change in the z direction), for illustrating the method of FIG. 1a;

DETAILED DESCRIPTION OF THE INVENTION

Before discussing below embodiments of the present invention referring to the figures, it is to be pointed out that same elements and structures are provided with same reference numerals such that the description thereof is mutually applicable or exchangeable.

Figure 1A:
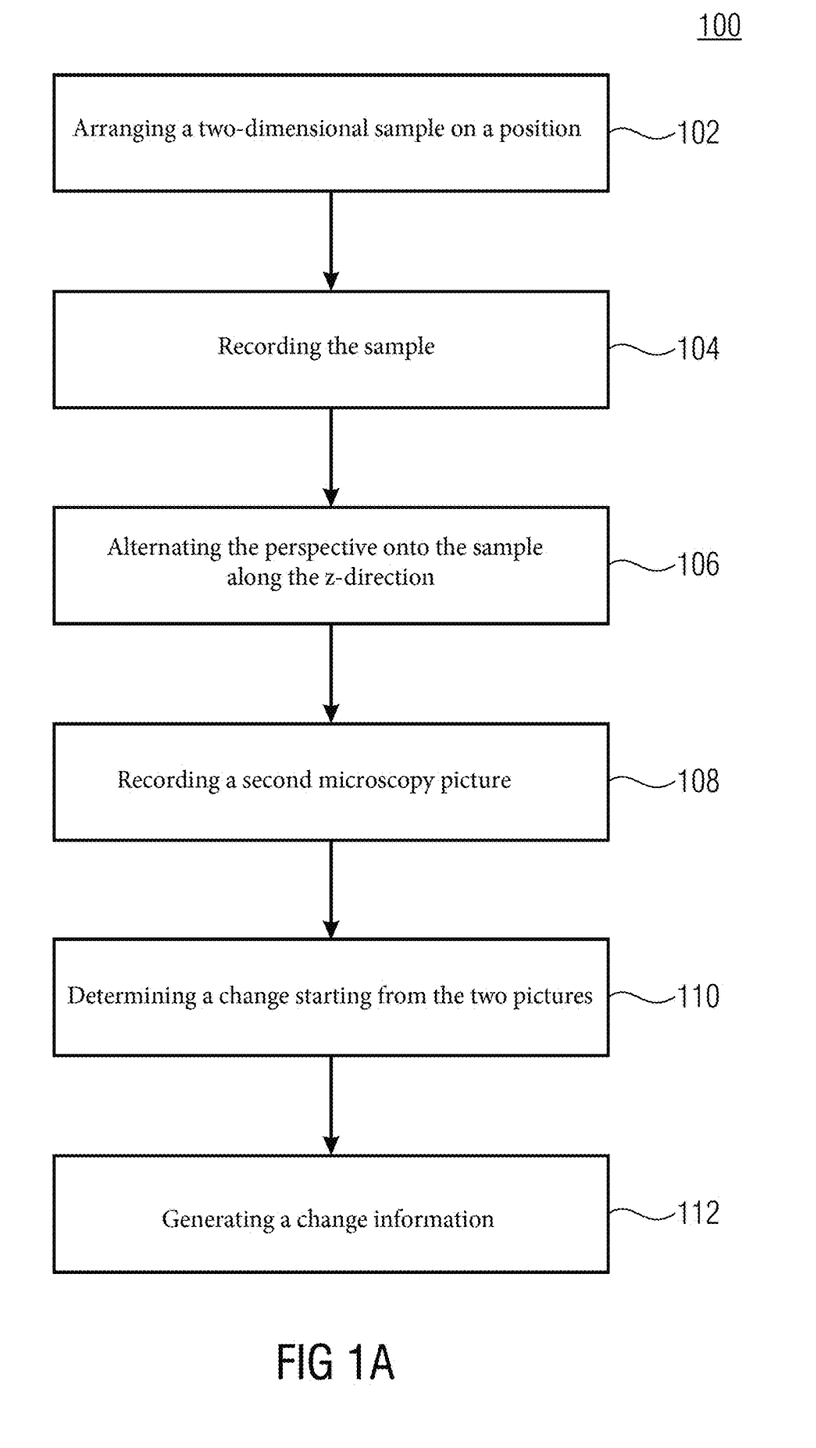
FIG. 1a is a schematic flowchart for illustrating the method for generating a microscopic panoramic representation in accordance with embodiments.

FIG. 1a shows the method for generating a microscopy representation 100. The method 100 comprises the six basic steps 102-112 which will be discussed below in particular referring to FIG. 1b, but also FIG. 1c.

Figure 1B:
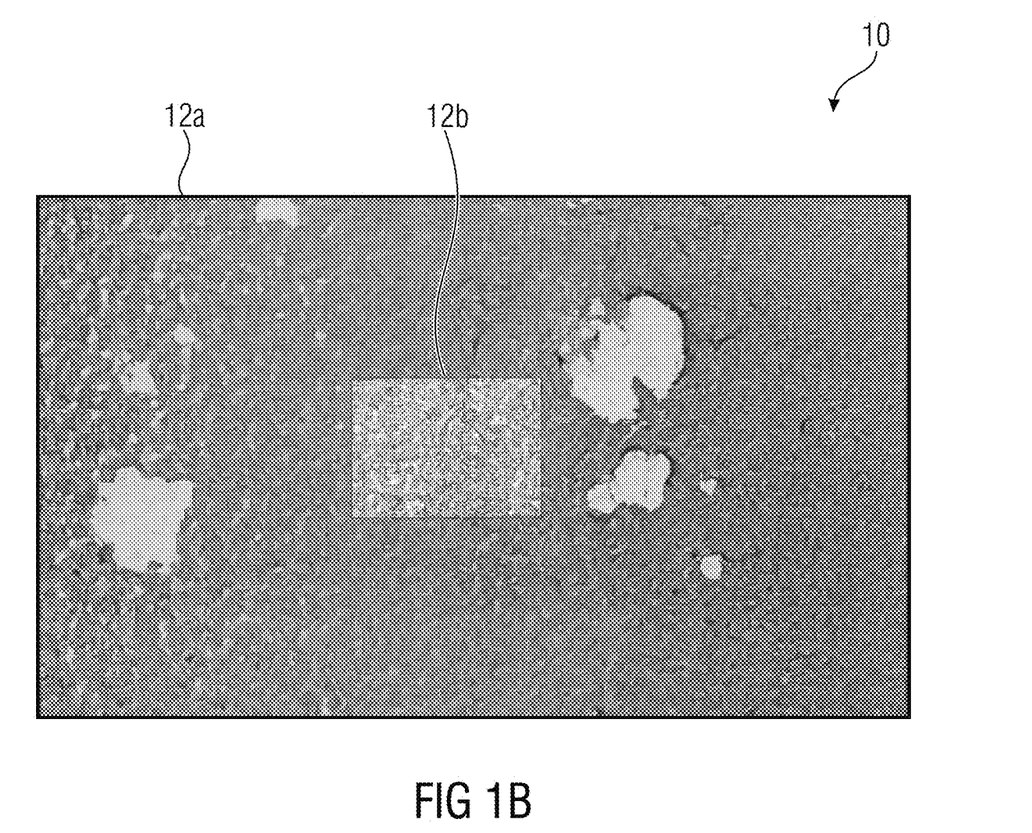

FIG. 1b shows a microscopy panoramic representation 10 comprising the microscopy representations 12a and 12b which are merged into each other so as to form the total microscopy panoramic representation 10. The microscopy pictures 12a and 12b are obtained by means of an imaging device, such as, for example, a camera using a microscope. Typically, samples which are present as a two-dimensional element (that is having an area) are examined using microscopes. Frequently, due to their lateral extensions, x and y directions, the samples comprise a larger region to be examined than the section which can be acquired by means of the microscope or by means of the individual microscopy pictures 12a and 12b.

In FIG. 1b, the microscopy panoramic representation 12b which, due to the fact that it has been recorded at a different magnification factor, exemplarily comprises a higher resolution, with its section is completely within the section of the microscopy picture 12a (overview picture).

Figure 1C:
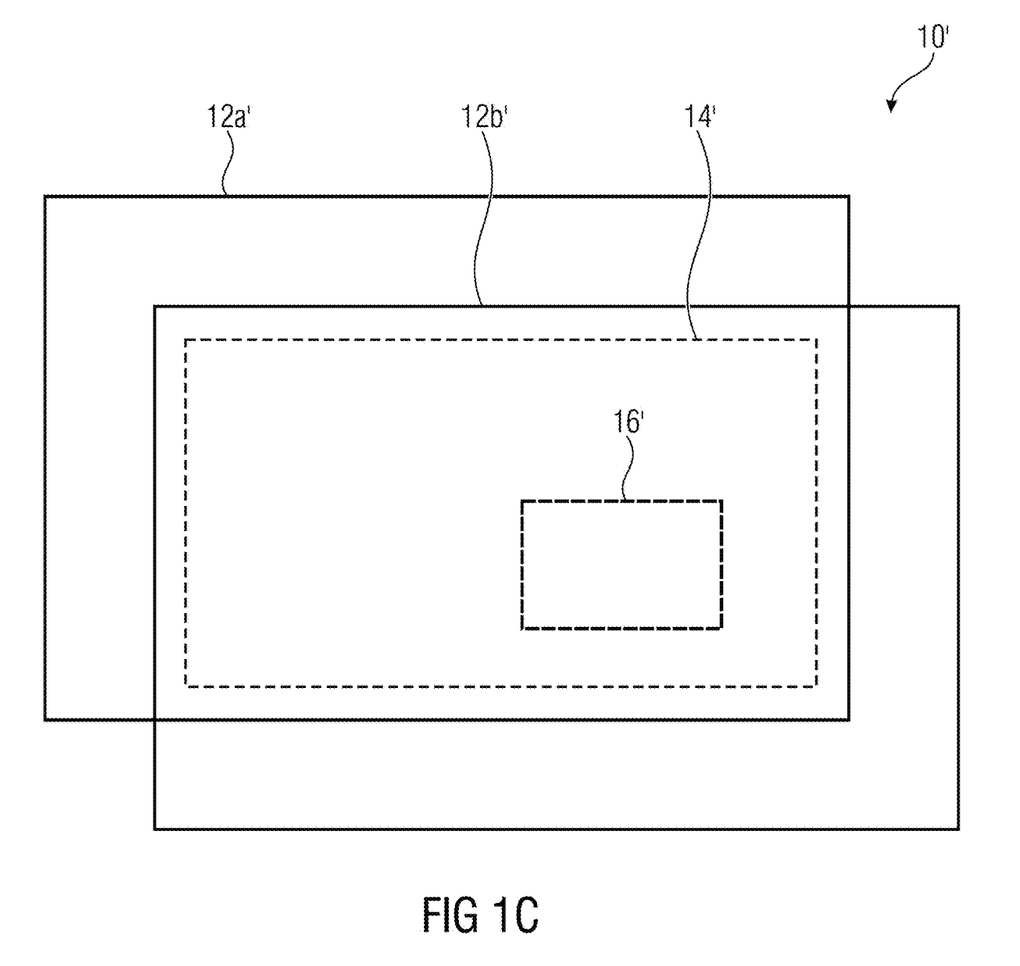

Merging the microscopy panoramic representation in FIG. 1c, however, is different. FIG. 1c shows a microscopy panoramic representation 10' including the two microscopy pictures 12a' and 12b'. As can be recognized, the microscopy panoramic representations 12a' and 12b' which exemplarily comprise an equal or comparable zoom factor, overlap only partially (that is not completely). By shifting the section on the sample between the microscopy pictures 12a' and 12b', the sample extending along the x and y directions may be examined or imaged with a larger region along the x and y direction. Thus, it is also possible to acquire the entire sample by means of the microscopy panoramic representation 10' by placing next to one another several individual microscopy pictures 12a' and 12b' which are adjacent to one another or overlap in an overlap region. The overlap region 14' is illustrated by broken lines.

The following steps are performed in the method 100 in the basic variation, that is when merging two microscopy pictures 12a and 12b or 12a' and 12b' to form the microscopy panoramic representation 10 and 10', respectively. In a first step 102, the two-dimensional sample is arranged on a positioner, for example the XY stage of the microscope which is shiftable manually, but also automatically.

The second step 104 refers to recording the sample by means of an imaging device in order to obtain the first microscopy picture 12a or 12a' having the first section. In a next step 106, the perspective onto the sample is altered along the z direction. This means that, for example, the focus on the sample surface is altered, for example to focus into another plane. This is of particular importance in microscopy since frequently very small depths of focus are operated with since minimum elevations or different planes which form due to the partial transparency of the sample are to be photocopied using the microscope—even when the sample is typically flat. As an alternative to the focus point variation, the zoom may be varied, for example by a zoom objective or by a changed objective. As a result of an enlarged region 12b, the same also comprises a higher resolution. Further variations in the z direction are also conceivable, for example by using filters so that the picture may be taken in different planes of the sample.

After having altered the perspective onto the sample in the z direction, the second microscopy picture (compare step 108) 12b or 12b' having a second section is recorded. It is to be pointed out again that the first region 12a and 12a' and the second region 12b and 12b' may be equal as regards the section or may comprise only the partial overlap region, wherein the overlapping region nevertheless differs in that a variation in the z direction, that is exemplarily altered focusing or, as is illustrated in FIG. 1b, altered zoom, has taken place. In a further step 110, the change is determined starting from the two images. Exemplarily, a change in objective may be recognized due to a region covered at times such that it may be concluded that the zoom (for example the objective) has altered. Alternatively, with altered focusing, a measure of sharpness may be determined per microscopy picture 12a versus 12b and 12a' versus 12b' in order to recognize the change in focus in this way. It is to be pointed out again that this measure of sharpness may be also determined only in parts. After having generated the change information, starting from this, in step 112, the first and the second microscopy picture 12a and 12b or 12a' and 12b' are merged to each other. Here, as may exemplarily be recognized from FIG. 1b, the region 12b having the increased magnification factor or the improved resolution resulting from this is inserted in the region 12a at that position which matches the section of the microscopy picture 12b. The known registration method which will be discussed below is employed here.

Alternatively, a lateral offset may also have taken place between the pictures 12a' and 12b', wherein the magnification factor is, for example, maintained (compare FIG. 1c). The two pictures 12a' and 12b' comprise an overlap region 14'. Since, as discussed in step 104, a change in the z direction has taken place, this overlap region or the pictures 12a' and 12b' in this overlap region may differ as regards an altered point of focus or an altered setting of sharpness (small aperture so as to achieve high a depth of focus), wherein, when merging 112, that microscopy picture will be selected for the region 14' which comprises an increased measure of sharpness or which has the greater measure of sharpness in a region, which here is referred to by 16', where a cell, for example, is to be examined in detail. As has been discussed above in the embodiment with the magnification variation, when merging the pictures 12a' and 12b', a corresponding registration takes place in order to merge the correct regions, for example the entire image 12b' including the overlap region 14', with the remainder of the microscopy picture 12a'.

The method applied for registration will be discussed below briefly. As has been discussed before, in the solution discussed referring to FIG. 1a, a microscope having a motor-operated stage does not necessarily have to be used, but it is sufficient for the stage to be operable by hand. The camera which is attached to a microscope is connected directly to a device using which a stitching method is performed. Thus, life images of the camera representing that specimens in different sections may be loaded directly into the software or the device which thus merges (stitches) same in real-time to form the microscopy panorama. As regards the setup, reference here is made to FIG. 4 which illustrates the device for stitching 20 or a computer having stitching software, in combination with a camera 17 and a manual microscope 19.

The underlying stitching method is exemplarily based on a feature-based rhythm using which several features are determined in the first microscopy picture 12a or 12a', and these features are determined again in the second microscopy picture 12b or 12b', thereby tracing this feature. Tracing the features determined in the first microscopy picture 12a or 12a' is referred to as tracking. The KLT algorithm, the Harris-Corner detector, the monotony operator, the SIFT (scale invariant feature transform) algorithm or the SURF (speeded up robust feature transform) algorithm may exemplarily serve as a feature-based algorithm. From these determined and tracked features, a transform matrix is calculated which serves for merging the microscopy pictures to form the microscopy panoramic representation. The transform matrix comprises at least six degrees of freedom, wherein it is assumed here that, in principle, only three degrees of freedom, that is X and Y and Z, but only in a limited extent, are varied since normally there is no rotation relative to the optics in a fixed microscopy plate which is shiftable only laterally. The transform matrix is, for example, an affine transform matrix having three or six degrees of freedom, or a projective transform matrix having eight degrees of freedom. The transform matrix which transfers the two microscopy pictures 12a/12a' and 12b/12b' into each other is calculated from the set of determined feature correspondences, that is the first and corresponding second feature coordinates relative to the features.

The feature-based algorithm thus allows generating microscopic image mosaics or microscopic total panoramic representations from individual microscopy pictures, wherein outlier recognition for erroneously tracked features is provided by the RANSAC algorithm. Thus, due to the feature-based algorithm, the method ensures fast and, due to the RANSAC algorithm, precise merging of the individual images, even when these exhibit only a low image quality (for example due to fast movements and, at the same time, variation of the perspective in the Z direction). In particular, the method is of a real-time quality, wherein real-time capability means at least 10 merged individual images per second when using a standard PC.

As regards further details which are used in the stitching method, reference is made to the patent document DE 10 2009 039 251 A1 and WO 2011/023657 A1. Advantageously, in accordance with embodiments, the stitching method applied may be extended, like in [2] and [3]. These aspects refer in particular to real-time processing and incrementally generating a panorama comprising the following basic steps:
 rectifying the images and detecting useless image regions (for example highlights);
 feature-based registration of neighboring frames;
 robust estimation of the transforms between the frames using RANSAC; and
 placing the individual images in a plane.

Furthermore, [3] describes above all dealing with "breaking off" the mosaicking process (for example when registration fails due to a poor image quality). This solution is generating sub-panoramas (sub-maps), which, in the best case, may be merged to form a total panorama at a later point in time when connections have been generated by again "scanning" the corresponding regions. Furthermore, reference is made to [1].

Advantageous fields of application of the method described are:

Documentation: image-based documentation of large continuous specimen areas in pathology management, LIS and PACS systems having a low barrier to entry. Integration as a "plugin" in existing or supplementation as special software solution(s).

Telepathology: in particular in "low-income" countries, slide scanners are usually not to be found for cost reasons. Digital individual images which are sent in or transferred on telepathology platforms for second opinions frequently do not reveal the correct image section. Larger image panoramas having been generated interactively using this invention allow more efficient telediagnostics and are easy to integrate using standard image formats.

Automatic and semi-automatic analyses: quantifying markers, for example Ki67 in tissue sections, are, up to now, performed only in connection with expensive slide scanners, since this is where greater regions of a (histological) specimen are usually acquired and counted. Using this invention, a sufficient number of continuous regions may be digitalized and such analyses also performed interactively using simple microscope workplaces, thereby opening up a new market for analysis software.

Figure 2A:
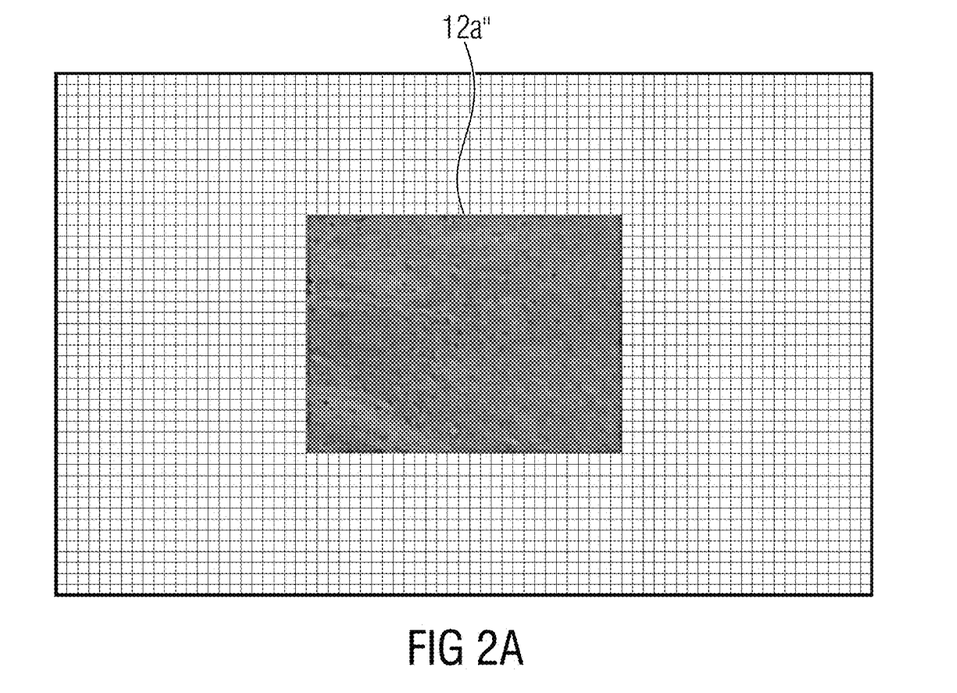
FIGS. 2a-2f are schematic microscopy pictures or microscopy panoramic representations for illustrating the procedure when generating microscopy panoramic representations in accordance with embodiments.
Figure 2B:
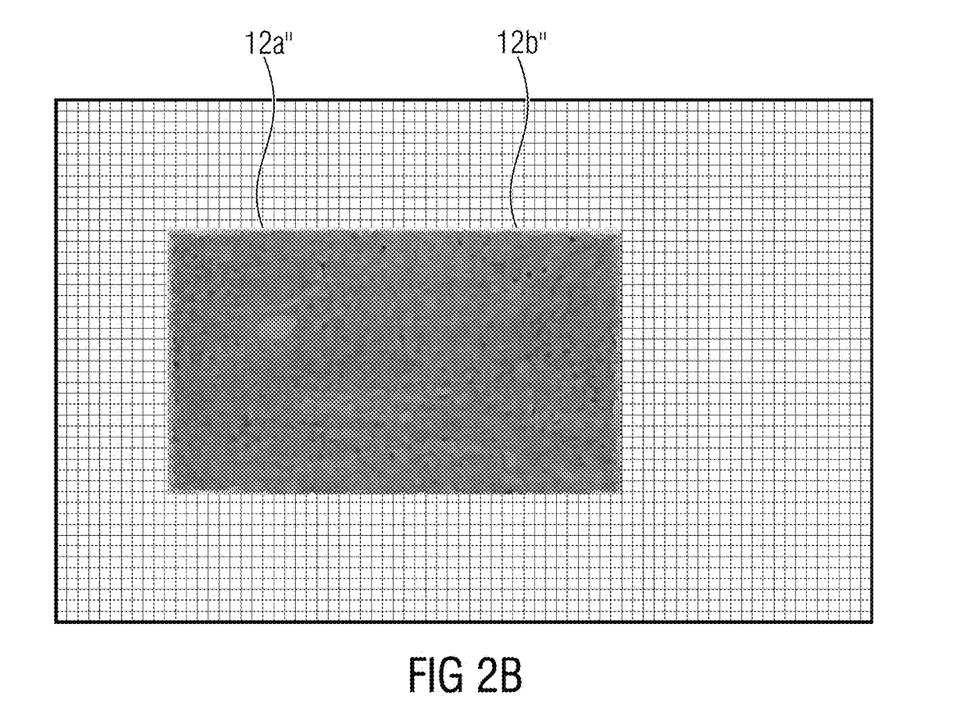

The method described may also be extended in that more than two microscopy pictures are connected to one another, as will be discussed below referring to FIGS. 2a to 2f. FIG. 2a shows the first picture 12a", wherein stitching has not yet started such that only an individual image is illustrated here. This individual image has been recorded in a life image mode. FIG. 2b shows stitching after the first two images, here pictures 12a" and 12b" which is represented in the center in the life mode. It is to be recognized here that this is a movement to the right such that the panorama is shifted to the left.

Figure 2C:
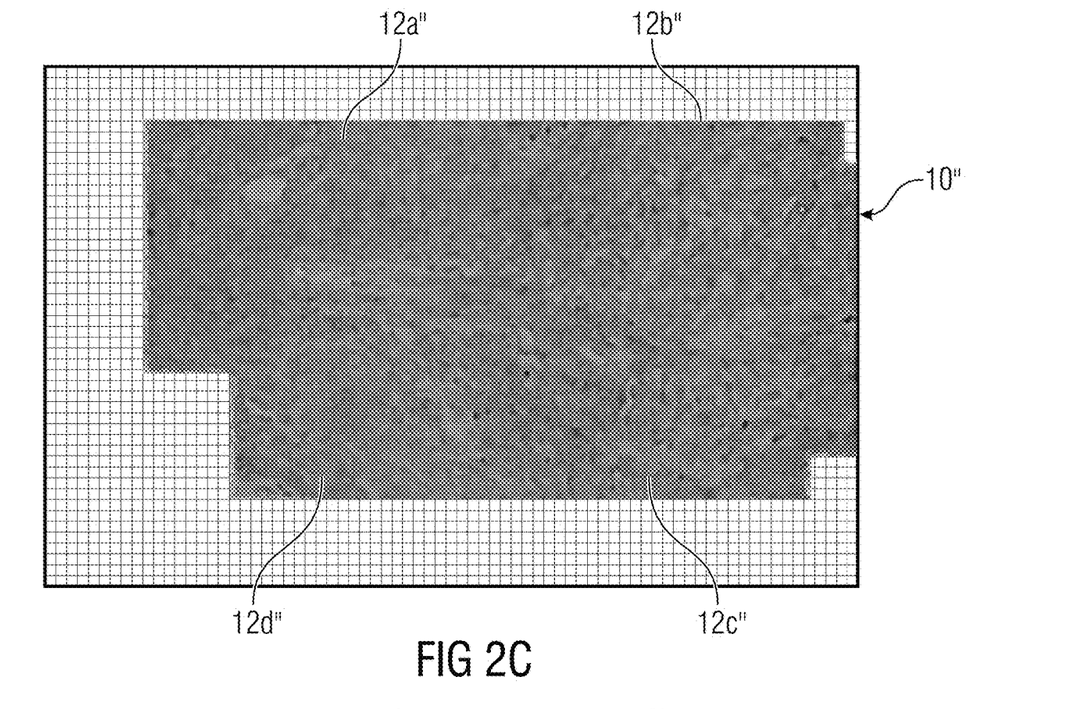

In FIG. 2c, the microscopy panorama representation 10 comprising the first pictures 12a" and 12b" is completed downwards by adding further images 12c" and 12d".

Figure 2D:
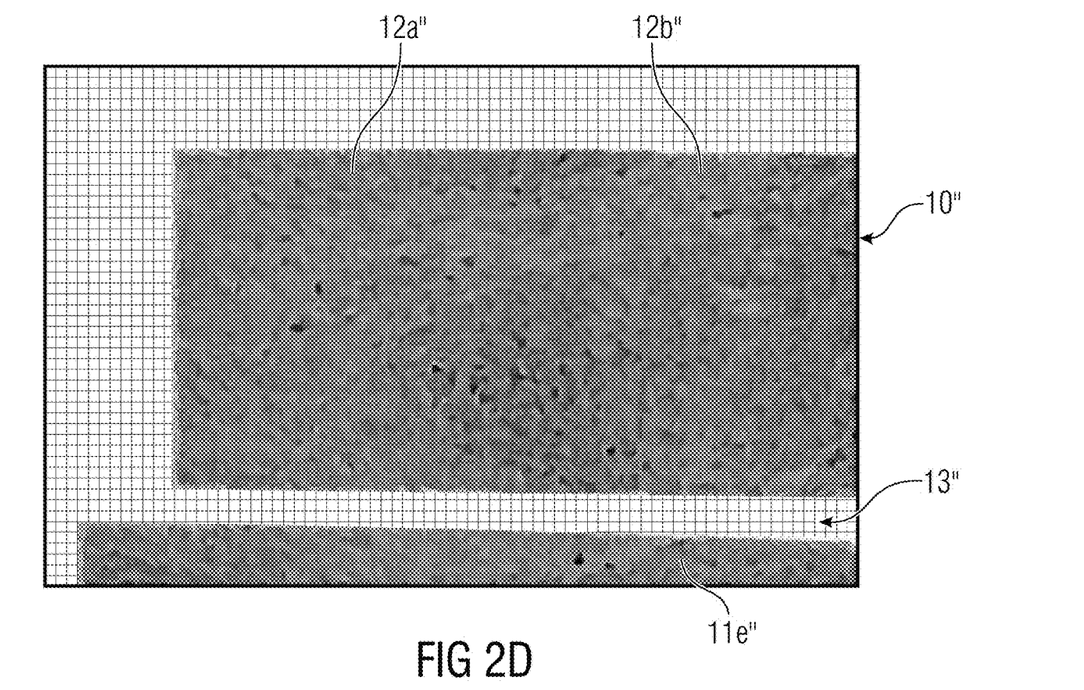
Figure 2E:
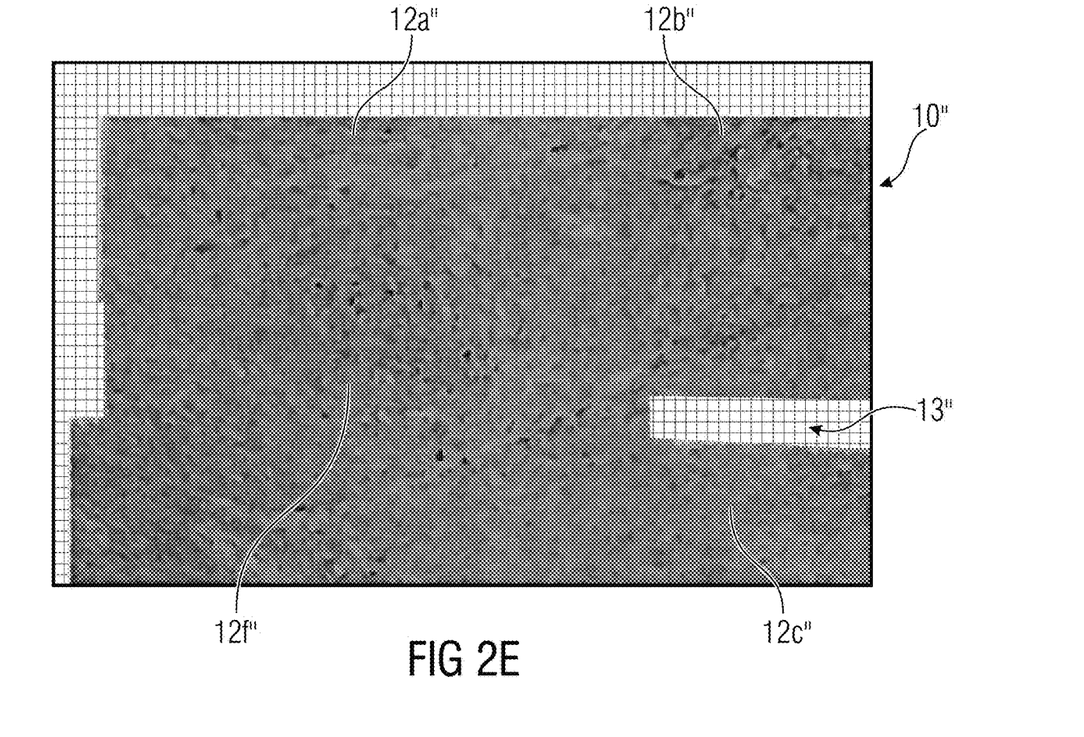
Figure 2F:
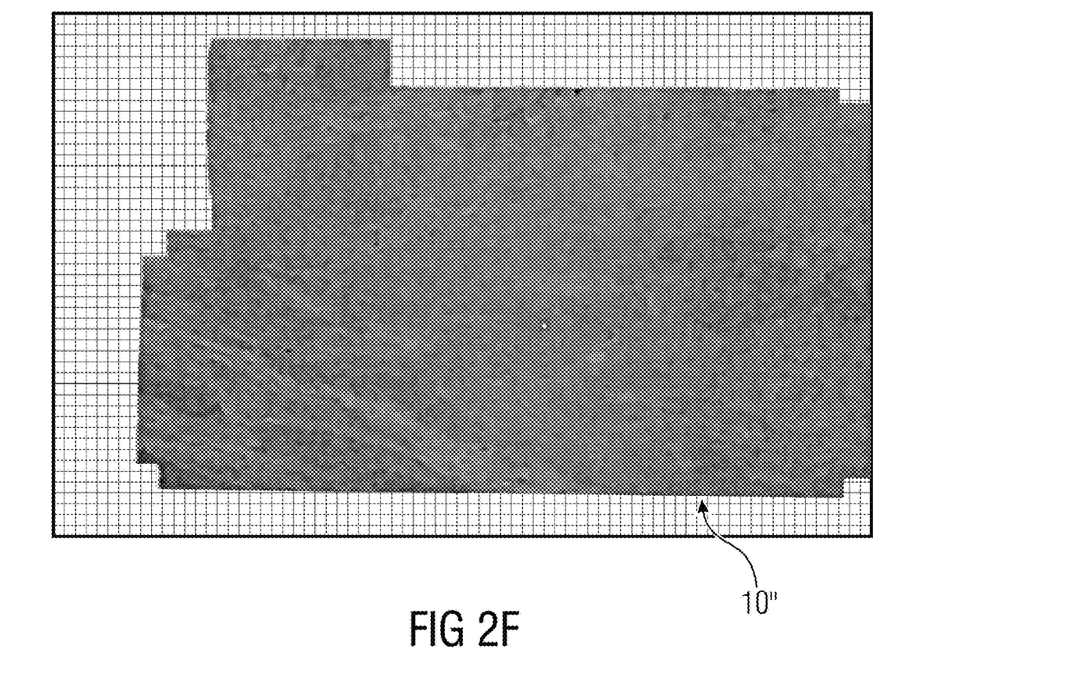

As is illustrated in FIG. 2d, due to a fast lateral offset, a gap (compare reference numeral 13") may form between the regions 12a" plus 12b" and 12e". As is illustrated in FIG. 2e, this gap is closed by a further picture 12f". It is pointed out here that such a gap 13", when stitching offline, would only be noticed when the entire panorama is generated and the sample is no longer available in the microphone so that no correction may be done. In order to ensure the closing, real-time stitching is the advantageous procedure. The result, that is the microscopy panoramic representation 10", is illustrated in FIG. 2f. Individual regions here may be zoomed into, the virtual slides be navigated within, as is, for example, also possible in Google Maps when using a mouse. The total panoramic representation 10" may be stored as an image, for example as JPEG or Tiff, or also in other formats which allow several image planes, for example.

As has been discussed above, in contrast to the conventional usage of image panoramas, for example in photography for recording landscape panoramas, or also the solution suggested for the field of endoscopy, focusing in microscopy is important due to the low depth of focus of the microscopy objective.

This means that, while recording the image panorama, which takes place by shifting the stage in the XY direction using the positioner, corrections in the Z direction (focusing) may also be necessitated. This means that a "stack" of images in different Z positions is recorded, at a certain XY position, for example, until the user has set a sharp image.

There are three different variations for this which will be discussed below, wherein in particular the individual steps will be mentioned in the corresponding order.

The first extension relates to autofocus. The steps here are:

when an image tile has already been inserted into the panorama at a position XY and a new image is recorded;

determining a measure of sharpness for both images B; and inserting the image for which the measure of sharpness is higher, into the panorama.

It is to be mentioned that inserting in this context and also generally both "replacing" and additive/parallel "storing" in another storing plane may be used in the sense of adding.

A further variation may refer to the so-called extended depth of focus. This includes the following steps:

for new recorded images, the intersection with the panorama is determined;

the "sharper", that is better focused, image regions are transferred into the panorama;

"extended depth of focus" methods known from the known technology are used here; and this means that, in accordance with embodiments, a local measure of sharpness is determined for small surroundings within these overlapping image regions and the respective sharper image region transferred to the resulting panorama.

A further variation which is employed in accordance with embodiments is the so-called Z stack storage. For storing the several storage planes, the Z stack storage comprises the following steps:

storing all ingoing images and positioning same in the panorama using corresponding data management; not "flat" as an image;

there is still a possibility of "manual" focusing when considering afterwards. This feature is, for example, of interest in cytology and hematology, where, within special (conspicuous) cells, a focus stack is recorded for individual cells; and for local z stacks at a position, the image of the highest measure of sharpness determines the "plane 0" using which the neighboring image tiles are synchronized to one another.

In the end, the several pictures with the partly or completely overlapping sections are, for example, stored as several individual image files, wherein the relation among the several pictures is stored (may be separately, for example as an XML file).

As has already been discussed above, referring to FIGS. 2d and 2e, as a consequence of very fast movements of the microscope stage, for example, when the user navigates, the result may be that there are no overlaps between two successive camera images (in particular with low frame rates). The precise procedure in such a case will be discussed below referring to FIGS. 3a-3e.

Figure 3A:
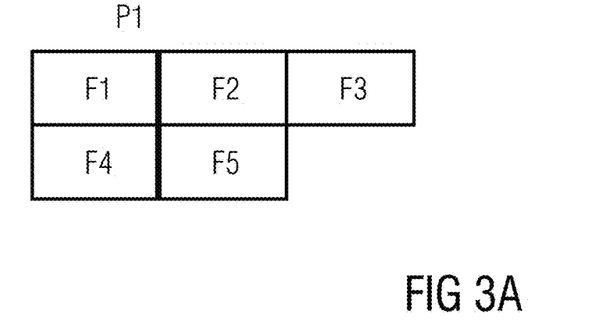
FIGS. 3a-3e are schematic block diagrams for illustrating a certain mode when generating a microscopy panoramic representation in accordance with embodiments.
Figure 3B:
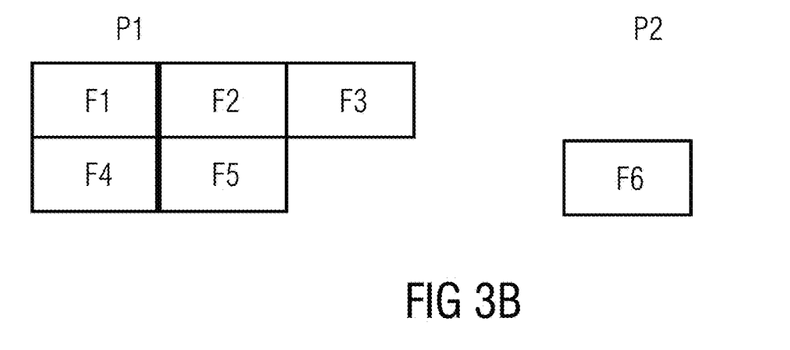

The situation as is illustrated in FIG. 3a is assumed here where a first image panorama P1 comprising the frames F1-F5 has been recorded, wherein in another frame a further panorama P2 is then recorded, as is illustrated in FIG. 3b. The new frame F6 does not overlap with any of the old frames F1-F5.

Figure 3C:
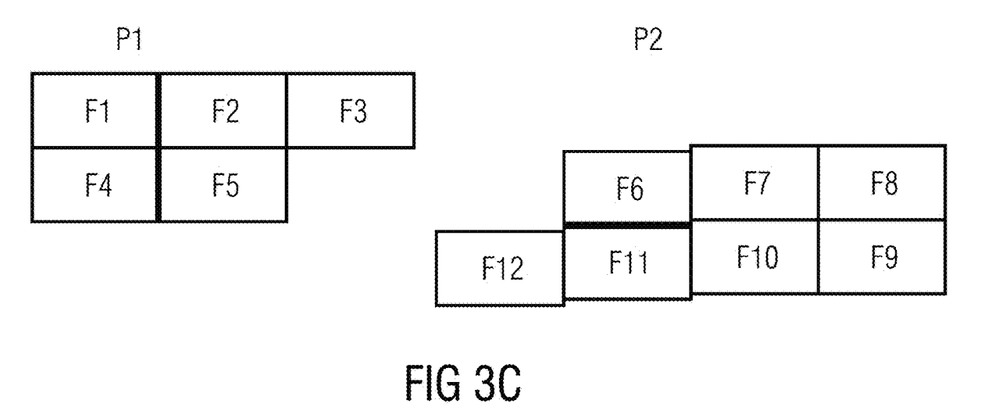

Starting from the new frame F6, further frames F7-F12 adjacent to frame F6 are recorded in the panorama representation P2 (FIG. 3c).

Figure 3D:
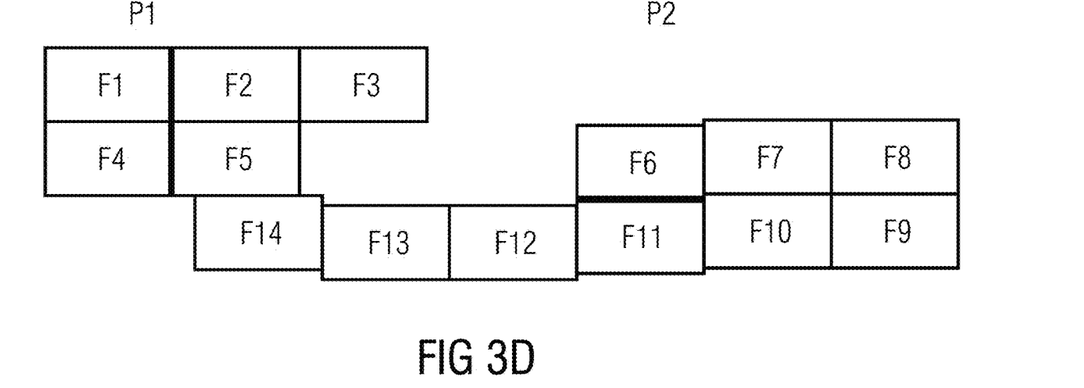
Figure 3E:
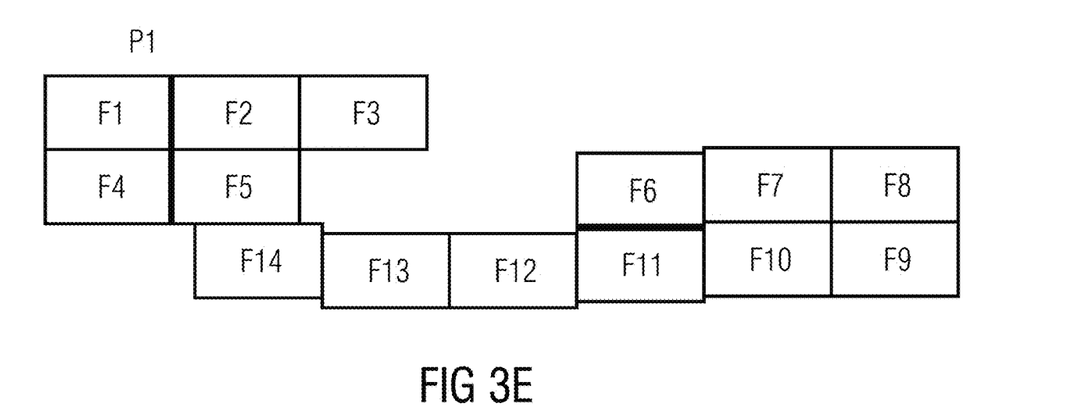

In analogy to stitching a new frame to a panorama, a parallel background process may test continuously using image features whether two panoramas P1 and P2 grow together, as is illustrated in FIG. 3d. These are then fused in a type such that there is only the panorama P1 left (compare FIG. 3e). Alternatively, a list of N panoramas P1 . . . PN which have not yet been fused so far may be output to the user.

As has been indicated above, a change in objective may be detected in accordance with a further embodiment. When switching objectives, an image sequence consisting of several images or even an individual image, is covered by a black region partly or completely. This black area forms when a revolving element of the objective prevents the light path from impinging on the camera. Features of an image sequence when switching objectives are:

large homogeneous black (dark) areas at the image borders
round geometry (objective/lens edge)
increasing and afterwards decreasing area size of the covered region(s)

Using these features, the change in objective may, for example, be detected automatically by means of a threshold value method and blob finding. In the case of a zoom objective or exchangeable objective, the magnification factor may also be determined alternatively. Exemplarily, it may be ensured after changing the objective which of the objectives is being active. This step is necessitated due to the following scenarios:

objective is changed normally
objective is changed several times (for example when the revolving element of the objective has three objectives with a 10fold, 20fold, 40fold magnification. A change is made from position 1 to position 3 in a clockwise direction and/or counterclockwise direction)
objective is changed several times and goes back to the original position.

These scenarios are basically covered by means of a registration method, for example by registering with the panorama sub-images scaled in correspondence with the objectives present. The best-focused image before and after changing the objective is fit into the panorama for registration.

As a result, the images of a higher magnification are visualized graphically in the slight overview as thumbnails or by a frame. This allows localizing, using several individual images, diagnostically relevant individual images of a high resolution in the anatomic context, in an image or panorama of a low resolution very easily.

In order to generate a coherent total panorama, it is sometimes not sufficient to exclusively successively merge successive images. The result over time is an accumulating error which becomes noticeable particularly when a region of the microscope slide recorded already is addressed repeatedly, that is in the case of "loop closing". In accordance with embodiments, this loop closing is recognized by the stitching method and treated correspondingly. In the special field of robotics, this method is referred to as "loop closing" and particularly applied in mapping [4]. For life stitching in microscopy, loop closing is applied as follows:

Determining whether there is an overlap between the newest frame and all the frames or a selection of the predecessor frames.
When detecting an overlap, performing registration using these frames.
Optimizing the positions of the frames in the panorama such that a global measure of error (which considers all the registration results) is minimized. For example, minimizing the back projection error using the Levenberg-Marquardt algorithm.

In accordance with further embodiments, the stitching method discussed referring to FIG. 1 and, in particular, referring to step 112, may also be performed in a multi-modal manner. When the camera system comprises several illumination modalities (white light, phase contrast, fluorescence) and the specimen has been dyed by fluorescence colorants in a suitable manner, these are excited by fluorescence illumination and made visible by suitable fluorescence filters. The specimen is considered again for each FL colorant (and in transmitted light or PK) or shifted under the eyepiece. The mutually registered images in several panoramas lying one above the other of different colorations are made to coincide by suitable data structures. In contrast to the above mentioned methods for registering endoscopy images or histological transmitted light images, when registering FL images, different methods are also used, such as spectral techniques with registration in the Fourier space or mutual information.

In accordance with further embodiments, so-called inter-active annotation is employed. Conspicuous regions, cells, etc. in large image panoramas have to be recovered. Enhancing and combining the panoramas with further (external) information is possible by means of digital annotation of positions of panoramas of interest and connecting these positions to metadata (other images, URL, other documents).

Figure 4:
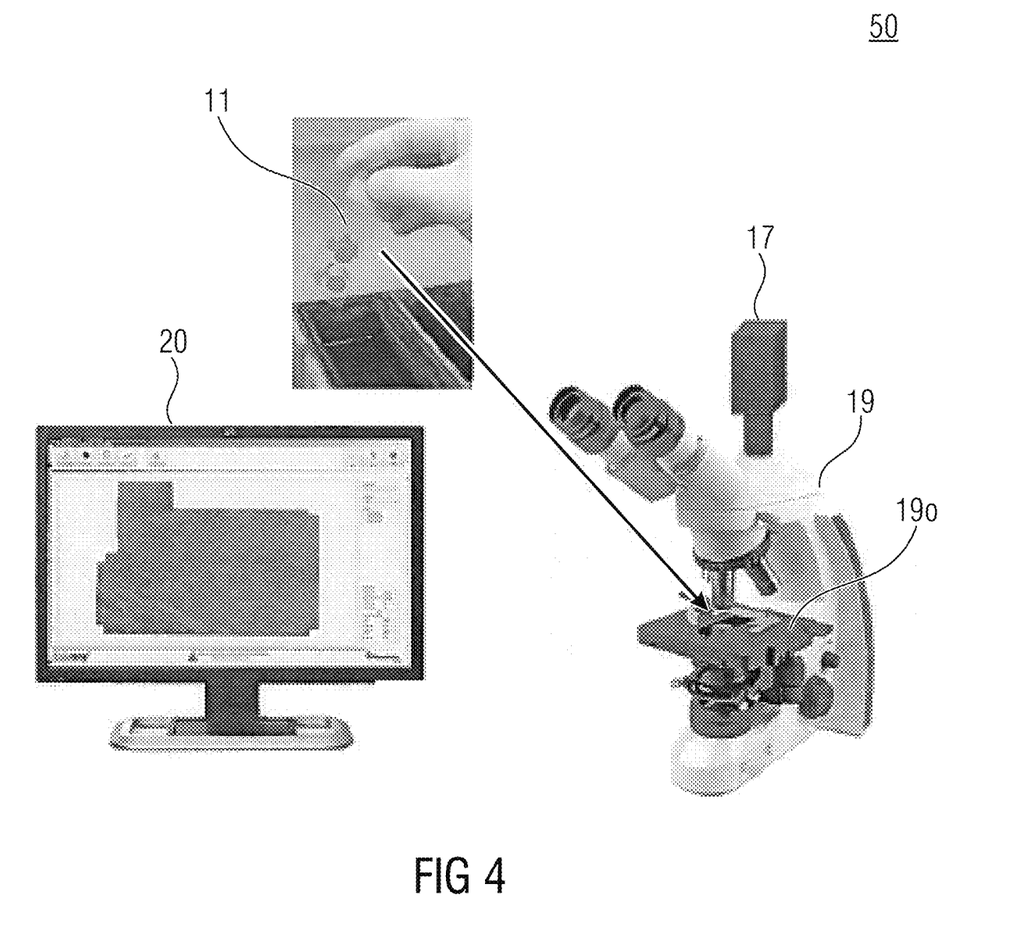
FIG. 4 shows a system comprising a microscope and a device for generating microscopy panoramic representations in accordance with embodiments.

Even when the above embodiments have been discussed in connection with a method, it is to be pointed out that further embodiments relate to a corresponding device which is configured to generate, starting from at least two microscopy pictures, a microscopy panoramic representation, wherein the two microscopy pictures differ by a change in perspective in the z direction. This device is shown in FIG. 4 which illustrates the system 50, and is provided with the reference numeral 20. In the basic version, the device includes at least an interface for receiving the microscopy pictures and a processor for analyzing or for comparing the microscopy pictures received and for merging same.

Further embodiments relate to the system 50 illustrated in FIG. 4 comprising the device 20, at least one camera 17, and the microscope 19. The microscope 19 comprises the positioner 190 for the object 11.

The positioner or the positioning unit 190 may, for example, be a holder for a microscope slide, for example a clamp or a shiftable platform (of the microscope) which may also be referred to as an XY stage with a Z shifter. In the easiest case, the positioning unit 190 may be the stage onto which the object 11 to be examined is located.

Even when the above system 50 and the above device 20 and even the method 100 have been discussed in particular in connection with medical microscopy examination, it is to be pointed out that these embodiments may be applied equally to other applications, like technical microscopy, such as, for example, analyzing metallic and mineral or stone surfaces (grinding patterns), for example in material research and quality management.

Although some aspects have been described in the context of a device, it is clear that these aspects also represent a description of the corresponding method, such that a block or element of a device also corresponds to a respective method step or a feature of a method step. Analogously, aspects described in the context of a method step also represent a description of a corresponding block or item or feature of a corresponding device. Some or all of the method steps may be executed by (or using) a hardware apparatus, like, for example, a microprocessor, a programmable computer or an electronic circuit. In some embodiments, some or several of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray disc, a CD, an ROM, a PROM, an EPROM, an EEPROM or a FLASH memory, a hard drive or another magnetic or optical memory having electronically readable control signals stored thereon, which cooperate or are capable of cooperating with a programmable computer system such that the respective method is performed. Therefore, the digital storage medium may be computer readable.

Some embodiments according to the invention include a data carrier comprising electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer.

The program code may for example be stored on a machine-readable carrier.

Other embodiments comprise the computer program for performing one of the methods described herein, wherein the computer program is stored on a machine-readable carrier.

In other words, an embodiment of the inventive method is, therefore, a computer program comprising a program code for performing one of the methods described herein, when the computer program runs on a computer.

A further embodiment of the inventive methods is, therefore, a data carrier (or a digital storage medium or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises processing means, for example a computer, or a programmable logic device, configured to or adapted to perform one of the methods described herein.

A further embodiment comprises a computer having installed thereon the computer program for performing one of the methods described herein.

A further embodiment according to the invention comprises a device or a system configured to transfer a computer program for performing one of the methods described herein to a receiver. The transmission can be performed electronically or optically. The receiver may, for example, be a computer, a mobile device, a memory device or the like. The device or system may, for example, comprise a file server for transferring the computer program to the receiver.

In some embodiments, a programmable logic device (for example a field-programmable gate array, FPGA) may be used to perform some or all of the functionalities of the methods described herein. In some embodiments, a field-programmable gate array may cooperate with a microprocessor in order to perform one of the methods described herein. Generally, the methods may be performed by any hardware apparatus. This can be a universally applicable hardware, such as a computer processor (CPU) or hardware specific for the method, such as ASIC.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

LITERATURE

[1] T. Bergen und T Wittenberg, "Stitching and Surface Reconstruction from Endoscopic Image Sequences: A Review of Applications and Methods", IEEE Journal of Biomedical and Health Informatics, Vol. PP, No. 99, p. 1-1, 2014.

[2] T. Bergen, S. Ruthotto, C. Münzenmayer, S. Rupp, O. Paulus, und C Winter, "Feature-based real-time endoscopic mosaicking", in Image and Signal Processing and Analysis, 2009. ISPA 2009. Proceedings of the 6th International Symposium on, 2009, pp. 695-700.

[3] T. Bergen, T. Wittenberg, C. Munzenmayer, C. C. G. Chen, und G. D. Hager, "A graph-based approach for local and global panorama imaging in cystoscopy", in Proc. of SPIE Vol, 2073, Vol. 8671, p. 86771K-1.

[4] B. Williams, M, Cummins, J. Neira, P. Newman, I. Reid, und J. Tardös, "A comparison of loop closing techniques in monocular SLAM' Robotics and Autonomous Systems, Vol. 57, No. 12, pp. 1188-1197, 2009.

The invention claimed is:

1. A method for generating a microscopy panoramic representation of a three-dimensional sample comprising a lateral extension in the x and y directions, comprising:
   a) arranging the three-dimensional sample on a positioner;
   b) recording the sample by means of an imaging device in order to acquire a first microscopy picture of the sample comprising a first section;
   c) altering the perspective onto the two-dimensional sample in the z direction;
   d) recording the sample by means of the imaging device in order to acquire a second microscopy picture of the sample comprising a second section;
   e) determining change information which allows drawing conclusions as to the change in perspective in the z direction, using a difference between the first and second microscopy pictures; and
   f) merging the first and second microscopy pictures while considering the change information in order to acquire the microscopy panoramic representation;

wherein the first and second microscopy pictures or a region of the first and a region of the second microscopy picture differ as regards a magnification factor, and wherein the method comprises inserting the first or second microscopy picture into the microscopy panoramic representation or the region of the first microscopy picture or of inserting the region of the second microscopy picture into the microscopy panoramic representation, and wherein that microscopy picture or that region of the microscopy picture which comprises the greater magnification factor will be introduced;

wherein the method comprises detecting a change in objectives using a covered region in one of the microscopy pictures in order to determine the magnification factor; or wherein the method comprises determining the magnification factor using registerable regions in an overlapping section of the first and second microscopy pictures.

2. The method in accordance with claim 1, wherein the first section and the second section are at least partly overlapping such that the first and second microscopy pictures match at least partly as regards a match region, wherein, when merging, the first and second microscopy pictures in the match region are registered for the microscopy panoramic representation.

3. The method in accordance with claim 1, wherein the first and second microscopy pictures or a region of the first microscopy picture and a region of the second microscopy picture differ as regards focusing and/or sharpness, and wherein the method comprises inserting the first or second microscopy picture into the microscopy panoramic representation or of inserting the region of the first microscopy picture or the region of the second microscopy picture into the microscopy panoramic representation, wherein that microscopy picture or that region of the microscopy picture comprising a greatest relative measure of sharpness will be introduced.

4. The method in accordance with claim 3, wherein the method comprises determining a global or regional measure of sharpness per microscopy picture or per region of a microscopy picture.

5. The method in accordance with claim 4, wherein determining the measure of sharpness is determined such that a local measure of sharpness is determined in an overlapping region of the first and second microscopy pictures for each microscopy picture and the measures of sharpness determined are compared to one another.

6. The method in accordance with claim 1, wherein the microscopy panoramic representation comprises an increased resolution in the inserted region.

7. The method in accordance with claim 1, wherein the microscopy panoramic representation comprises regions for which there are several storage planes which differ as regards resolution, focus and/or sharpness.

8. The method in accordance with claim 3, wherein the first and second microscopy pictures which are merged in the microscopy panoramic representation, or the regions of the first and second microscopy pictures which are inserted into the microscopy panoramic representation differ in the z direction.

9. The method in accordance with claim 1, wherein the method comprises laterally shifting the sample in the x and/or y direction such that the first and second microscopy pictures or the regions of the first and second microscopy pictures which are introduced into the microscopy panoramic representation differ as regards the x and/or y perspective.

10. The method in accordance with claim 9, wherein the method comprises determining a movement vector which describes the lateral shift in the x and/or y direction, and wherein the movement vector is determined using a change in a feature in the first and second microscopy pictures.

11. The method in accordance with claim 9, wherein the first and second sections are not directly adjacent to each other.

12. The method in accordance with claim 11, wherein the method comprises recording the sample by means of the imaging device in order to acquire one or several third microscopy pictures of the sample comprising one or several third sections connecting the first and second sections.

13. The method in accordance with claim 1, wherein the method comprises optimizing the position of the first microscopy picture and the second microscopy picture and of further microscopy pictures among one another, wherein optimizing is performed such that an error when arranging the first, second and further microscopy pictures among one another is minimized.

14. The method in accordance with claim 1, wherein a) and b) and d) to f) are repeated for at least two different modes.

15. The method in accordance with claim 14, wherein the at least two modes are from the group comprising white light, phase contrast, fluorescence, dark field, bright field.

16. The method in accordance with claim 1, wherein the method comprises interactively emphasizing a region which differs as regards resolution, focus and/or sharpness.

17. A non-transitory digital storage medium having stored thereon a computer program for performing a method for generating a microscopy panoramic representation of a three-dimensional sample comprising a lateral extension in the x and y directions, comprising:
 a) arranging the three-dimensional sample on a positioner;
 b) recording the sample by means of an imaging device in order to acquire a first microscopy picture of the sample comprising a first section;
 c) altering the perspective onto the two-dimensional sample in the z direction;
 d) recording the sample by means of the imaging device in order to acquire a second microscopy picture of the sample comprising a second section;
 e) determining change information which allows drawing conclusions as to the change in perspective in the z direction, using a difference between the first and second microscopy pictures; and
 f) merging the first and second microscopy pictures while considering the change information in order to acquire the microscopy panoramic representation,
 when said computer program is run by a computer;
 wherein the first and second microscopy pictures or a region of the first and a region of the second microscopy picture differ as regards a magnification factor, and
 wherein the method comprises inserting the first or second microscopy picture into the microscopy panoramic representation or the region of the first microscopy picture or of inserting the region of the second microscopy picture into the microscopy panoramic representation, and wherein that microscopy picture or that region of the microscopy picture which comprises the greater magnification factor will be introduced;

wherein the method comprises detecting a change in objectives using a covered region in one of the microscopy pictures in order to determine the magnification factor; or wherein the method comprises determining the magnification factor using registerable.

18. A device for generating a microscopy panoramic representation of a three-dimensional sample comprising a lateral extension in the x and y directions, comprising:

an interface for receiving a first microscopy picture of the sample comprising a first section and a second microscopy picture comprising a second section, wherein the first microscopy picture and the second microscopy picture differ as regards the perspective in the z direction; and a processor configured to determine change information which allows drawing conclusions as to the change in perspective in the z direction, using a difference between the first and second microscopy pictures and merge the first and second microscopy pictures while considering change information in order to acquire a microscopy panoramic representation, wherein the first and second microscopy pictures or a region of the first and a region of the second microscopy picture differ as regards a magnification factor, and wherein the processor is configured to insert the first or second microscopy picture into the microscopy panoramic representation or the region of the first microscopy picture or to insert the region of the second microscopy picture into the microscopy panoramic representation, and wherein that microscopy picture or that region of the microscopy picture which comprises the greater magnification factor will be introduced;

wherein the processor is configured to detect a change in objectives using a covered region in one of the microscopy pictures in order to determine the magnification factor; or wherein the processor is configured to determine the magnification factor using registerable.

19. A system comprising a microscope and a device in accordance with claim 18.

* * * * *

UNITED STATES PATENT AND TRADEMARK OFFICE
CERTIFICATE OF CORRECTION

PATENT NO. : 10,582,126 B2
APPLICATION NO. : 15/294115
DATED : March 3, 2020
INVENTOR(S) : Christian Muenzenmayer et al.

It is certified that error appears in the above-identified patent and that said Letters Patent is hereby corrected as shown below:

In the Claims

Claim 17, Column 17, Line 5:
Change: "...factor using registerable."
To read: --...factor using registerable regions in an overlapping section of the first and second microscopy pictures.--

Claim 18, Column 18, Line 18:
Change: "...factor using registerable."
To read: --...factor using registerable regions in an overlapping section of the first and second microscopy pictures.--

Signed and Sealed this
Twenty-second Day of December, 2020

Andrei Iancu
*Director of the United States Patent and Trademark Office*